United States Patent
Chien et al.

(10) Patent No.: US 7,822,327 B2
(45) Date of Patent: Oct. 26, 2010

(54) METHOD FOR AUTOMATICALLY SELECTING SCENE MODE

(75) Inventors: Chung-Fang Chien, Taipei (TW); Che-Hung Lin, Puli Township (TW)

(73) Assignee: Altek Corporation, Hsinchu (TW)

( * ) Notice: Subject to any disclaimer, the term of this patent is extended or adjusted under 35 U.S.C. 154(b) by 153 days.

(21) Appl. No.: 12/197,039

(22) Filed: Aug. 22, 2008

(65) Prior Publication Data
US 2009/0169191 A1     Jul. 2, 2009

(30) Foreign Application Priority Data
Dec. 26, 2007   (TW) ............................... 96150378 A

(51) Int. Cl.
G03B 17/00    (2006.01)
G03B 7/00     (2006.01)
H04N 5/225    (2006.01)

(52) U.S. Cl. .................... 396/48; 396/125; 396/213; 348/220.1

(58) Field of Classification Search ................ 396/48, 396/125, 128, 213, 429; 348/220.1, 221.1, 348/345
See application file for complete search history.

(56) References Cited

U.S. PATENT DOCUMENTS
6,301,440 B1 * 10/2001 Bolle et al. ................. 396/128

* cited by examiner

Primary Examiner—Rochelle-Ann J Blackman
(74) Attorney, Agent, or Firm—Workman Nydegger

(57) ABSTRACT

A method for automatically selecting a scene mode applied in a photographic device is described. The method includes detecting an image to be captured; analyzing a principal feature of the image; comparing the principal feature with a feature standard of each scene mode according to a utilization rate ranging from high to low, so as to acquire a scene mode corresponding to the feature standard conforming to the principal feature; and adjusting current photographic parameters of the photographic device into photographic parameters corresponding to the acquired scene mode. By determining a comparison sequence according to utilization rate of each scene, the time for searching and comparing is reduced. Moreover, after each shooting, the utilization rate may be re-calculated according to the used scene mode, so as to quickly provide the scene mode required by a user.

9 Claims, 6 Drawing Sheets

METHOD FOR AUTOMATICALLY SELECTING SCENE MODE

CROSS-REFERENCE TO RELATED APPLICATIONS

This non-provisional application claims priority under 35 U.S.C. §119(a) on Patent Application No(s). 096150378 filed in Taiwan, R.O.C. on Dec. 26, 2007 the entire contents of which are hereby incorporated by reference.

BACKGROUND OF THE INVENTION

1. Field of Invention

The present invention relates to a photographic technology, and more particularly to a method for automatically selecting a scene mode, which decides a comparison sequence according to utilization rate of each scene so as to automatically select scene modes.

2. Related Art

During the recent years, digital cameras have replaced instamatics. After images are captured by a lens group, image data is optically converted by a charge coupled device (CCD) or a complementary metal oxide semiconductor (CMOS) into electronic data for being stored, so as to replacing the way of imaging on films by means of chemical photosensing in the conventional art.

When using the conventional camera, the user should adjust parameters such as shutter, aperture, and white balance according to different shooting scenes. The user who does not understand the camera parameter settings may not successfully shoot pictures by using the camera having parameters adjusted by the user, or even fail to use it. Currently, when many cameras are produced, a plurality of scene modes and the corresponding photographic parameters are preset, but the user is still required to determine and select appropriate scene mode, which is rather troublesome.

In order to facilitate the user, consumer digital cameras are further provided with an auto mode. Under the auto mode, it is unnecessary for the user to adjust the parameters and select the scene mode for shooting, and the camera will adjust the parameters conforming to the image to be shot. Under the auto mode in some of the cameras, the camera may distinguish the shooting scene to adjust the photographic parameters. The automatic scene selection mode design used on the current photographic device is not personalized, which usually acquires the principle feature of the image to be shot and compares with the feature standard of each scene mode according to the build-in settings. Therefore, the searching and comparison time is prolonged, and the user may miss the instant pictures.

SUMMARY OF THE INVENTION

In view of the above problems, the present invention is directed to a method for automatically selecting a scene mode for solving the problems in the conventional art.

The present invention is directed to a method for automatically selecting a scene mode applied in a photographic device for enabling the photographic device to compare the scene mode commonly used by the user or the photographic device in priority, so as to reduce the search and comparison time.

The method for automatically selecting a scene mode disclosed in the present invention is applied in a photographic device, and includes providing a plurality of scene modes, each corresponding to a utilization rate, at least one feature standard and a set of photographic parameters; detecting an image to be captured; analyzing the detected image to acquire at least one principal feature of the image; comparing the principal feature with the feature standard of each scene mode according to a comparison sequence of utilization rate ranging from high to low, so as to acquire the scene mode corresponding to the feature standard conforming to the principal feature; and adjusting the current photographic parameters of the photographic device into photographic parameters corresponding to the acquired scene mode.

The method for automatically selecting a scene mode disclosed in the present invention further includes: after the photographic device captures images based on the adjusted photographic parameters, re-calculating the utilization rate to update the utilization rate of each scene mode.

In another method for automatically selecting a scene mode of the present invention, a usage frequency of each scene mode is used to replace the utilization rate, so that the step of calculating the utilization rate of each scene mode is omitted. The step of comparing the principal feature with the feature standard of each scene mode according to the usage frequency includes: reading a feature standard of one of the scene modes according to the usage frequency ranging from high to low; comparing the principal feature with the read feature standard; when the principal feature conforms to the read feature standard, acquiring the set of photographic parameters of the corresponding scene mode; when the principal feature does not conform to the read feature standard, reading the feature standard of the next scene mode according to the usage frequency ranging from high to low, and returning to the step of comparing the principal feature with the read feature standard.

In a method for automatically selecting a scene mode of the present invention, firstly, according to the habit of common person using various scene modes, the utilization rate, the feature standard, and the photographic parameter of each scene mode are recorded and stored. When an image is to be shot, the principal feature of the image is captured and analyzed by the photographic device. Then, the principal feature of the image is compared with the feature standard of each stored scene according to the utilization rate ranging from high to low, so as to acquire a scene mode conforming to the principal feature. The current photographic parameters are replaced by the photographic parameters of the scene mode. The comparison is made by using the utilization rate of a common person on each scene, the time for searching and comparison is reduced, such that the user may obtain preferred images with parameters mostly fitted the scene at once. Furthermore, each used scene mode may be incorporated into the former utilization rate, so as to re-calculate the utilization rate of each scene, and achieve the utilization rate of each scene better meeting the user's demand.

Features and embodiments of the present invention will become apparent from the detailed description given hereinafter with reference to the drawings.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
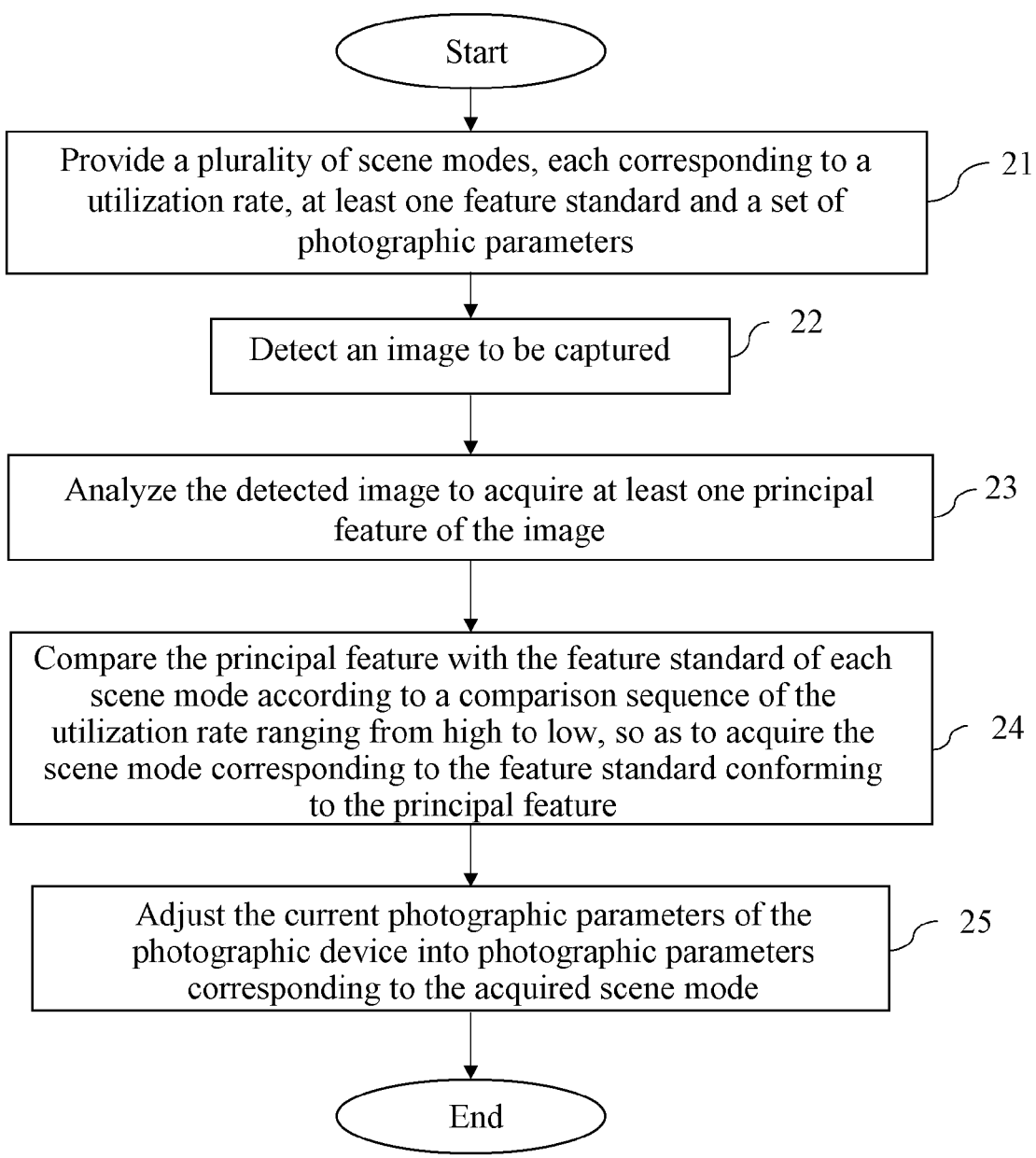
FIG. 1 is a flow chart according to a first embodiment of the present invention.

FIG. 1 is a flow chart according to a first embodiment of the present invention. Referring to FIG. 1, the method for automatically selecting a scene mode disclosed in this embodiment is applied in a photographic device, and includes providing a plurality of scene modes, each corresponding to a utilization rate, at least one feature standard, and a set of photographic parameters (Step 21); detecting an image to be captured (Step 22); analyzing the detected image to acquire at least one principal feature of the image (Step 23); comparing the principal feature with the feature standard of each scene mode according to a comparison sequence of the utilization rate ranging from high to low, so as to acquire the scene mode corresponding to the feature standard conforming to the principal feature (Step 24); adjusting the current photographic parameters of the photographic device into photographic parameters corresponding to the acquired scene mode (Step 25).

In this embodiment, the scene mode includes more than two of a landscape mode, a portrait mode, a night mode, a macro mode, a motion mode, and other modes. As for the portrait mode, the feature standard may be set as the portrait occupies more than one third of the image, or less than one third, such as one fourth or one fifth, which depends on the manufacturers. The photographic parameter may be set as at least one of face focusing first, face light measuring first, and skin color tone stressing.

For example, the scene mode mostly used by the user is portrait and landscape. Among the utilization rates of all the scene modes, the utilization rate of the portrait mode is 45%, the utilization rate of the landscape mode is 35%, and the utilization rate of other modes may be 20%. Moreover, when the photographic device applying the method for automatically selecting a scene mode according to an embodiment of the present invention is produced, according to the habits of common persons (or the main consumer group of the photographic device) using various scene modes, the utilization rate, the feature standard and the photographic parameters of each scene mode are set and recorded therein. When an image is to be shot, the photographic device captures and analyzes the principal feature of the image, and compares the principal feature of the image with the feature standard of each scene according to the utilization rate ranging from high to low, so as to acquire the scene mode conforming to the principal feature. In other words, since the user of the photographic device usually has a habit of shooting specific images, the comparison sequence is determined according to the utilization rate of the scene mode, and thus the comparison frequency is reduced and further the automatic selection of the scene modes is further accelerated. For example, the commonly used scene modes are ranged according to the using frequency of a common person as the portrait mode, then the landscape mode, and then the night mode and other modes. Therefore, when the principal feature of image is acquired, the feature standard of the portrait mode is compared firstly. If the principal feature of the image is different from the feature standard of the portrait mode, the feature standard of the landscape mode is compared. If the principal feature of the image is still different from the feature standard of the landscape mode, the night mode and other modes are compared sequentially. When the scene mode conforming to the principal feature of the image is acquired, the current photographic parameters are replaced with the photographic parameters of the scene mode. Thereby, by comparing according to the utilization rate of each scene of the common persons, the time for the searching and comparison is reduced, such that the user may obtain preferred images by using the photographic parameters mostly conforming to the scene.

Figure 2:
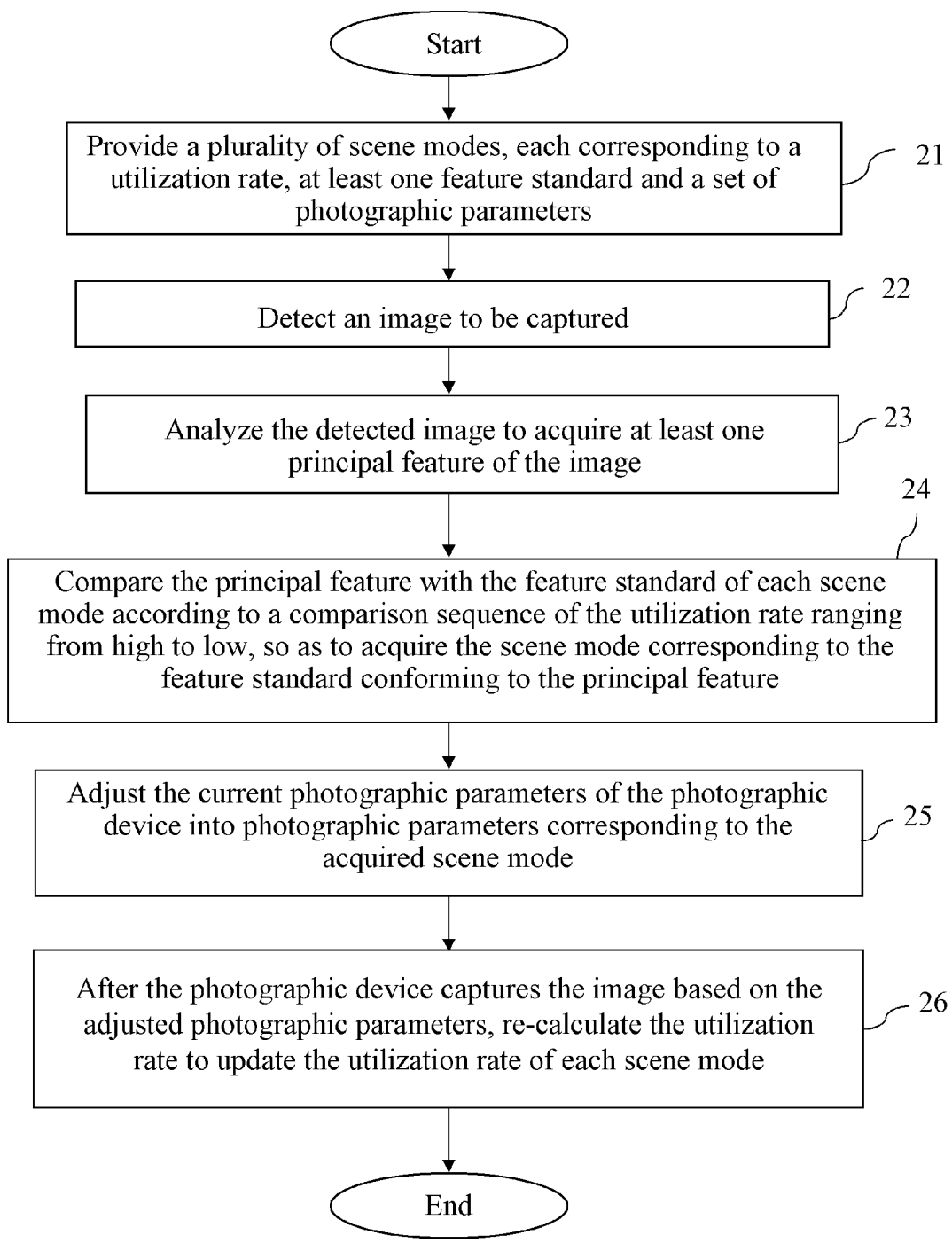
FIG. 2 is a flow chart according to a second embodiment of the present invention.

FIG. 2 is a flow chart according to a second embodiment of the present invention. Herein, after the photographic device captures the image based on the adjusted photographic parameters, the utilization rate is re-calculated to update the utilization rate of each scene mode (Step 26).

In other words, the scene mode used each time is incorporated into the former utilization rate, that is, the utilization rate of each scene is re-calculated to update the utilization rate of each scene mode. Thereby, the photographic device may better conform to the shooting habit of the user, so as to achieve the personalized settings for providing appropriate scene modes more quickly.

Figure 3:
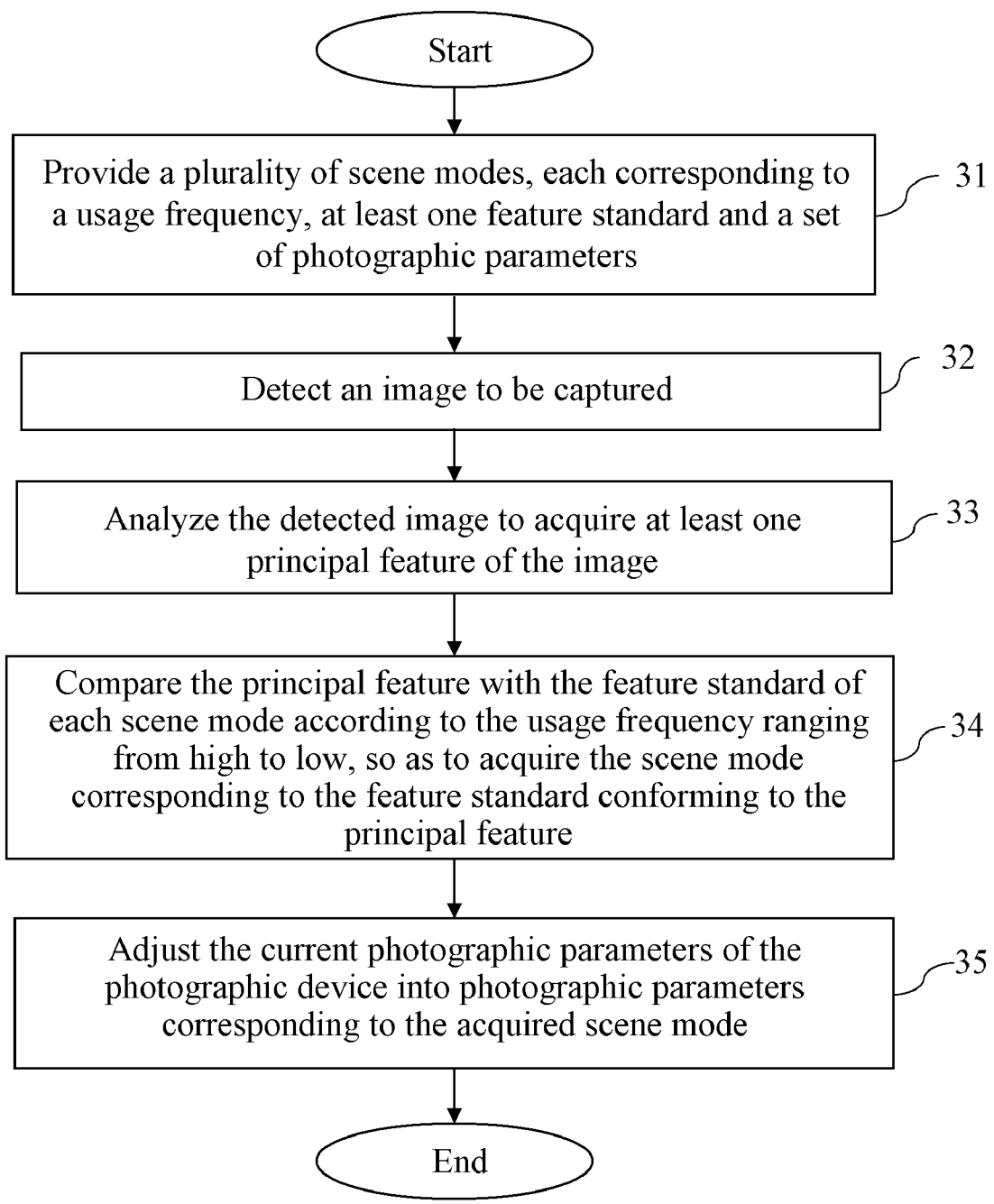
FIG. 3 is a flow chart according to a third embodiment of the present invention.

FIG. 3 is a flow chart according to a third embodiment of the present invention. The method for automatically selecting a scene mode disclosed in this embodiment is applied in a photographic device, and includes providing a plurality of scene modes, each corresponding to a usage frequency, at least one feature standard, and a set of photographic parameters (Step 31); detecting an image to be captured (Step 32); analyzing the detected image to acquire at least one principal feature of the image (Step 33); comparing the principal feature with the feature standard of each scene mode according to the usage frequency ranging from high to low, so as to acquire the scene mode corresponding to the feature standard conforming to the principal feature (Step 34); and adjusting the current photographic parameters of the photographic device into photographic parameters corresponding to the acquired scene mode (Step 35).

In this embodiment, the usage frequency of each scene mode is used to replace the utilization rate. Herein, the usage frequency of each scene mode used by a common person is directly compared with the principal feature of the image. After each shooting, it is only necessary to sum the used scene mode or the usage frequency in a recent period, so as to avoid making the statistic calculation on each mode to update the utilization rate of each scene mode. Thereby, the calculation time for the photographic device is reduced.

Figure 4:
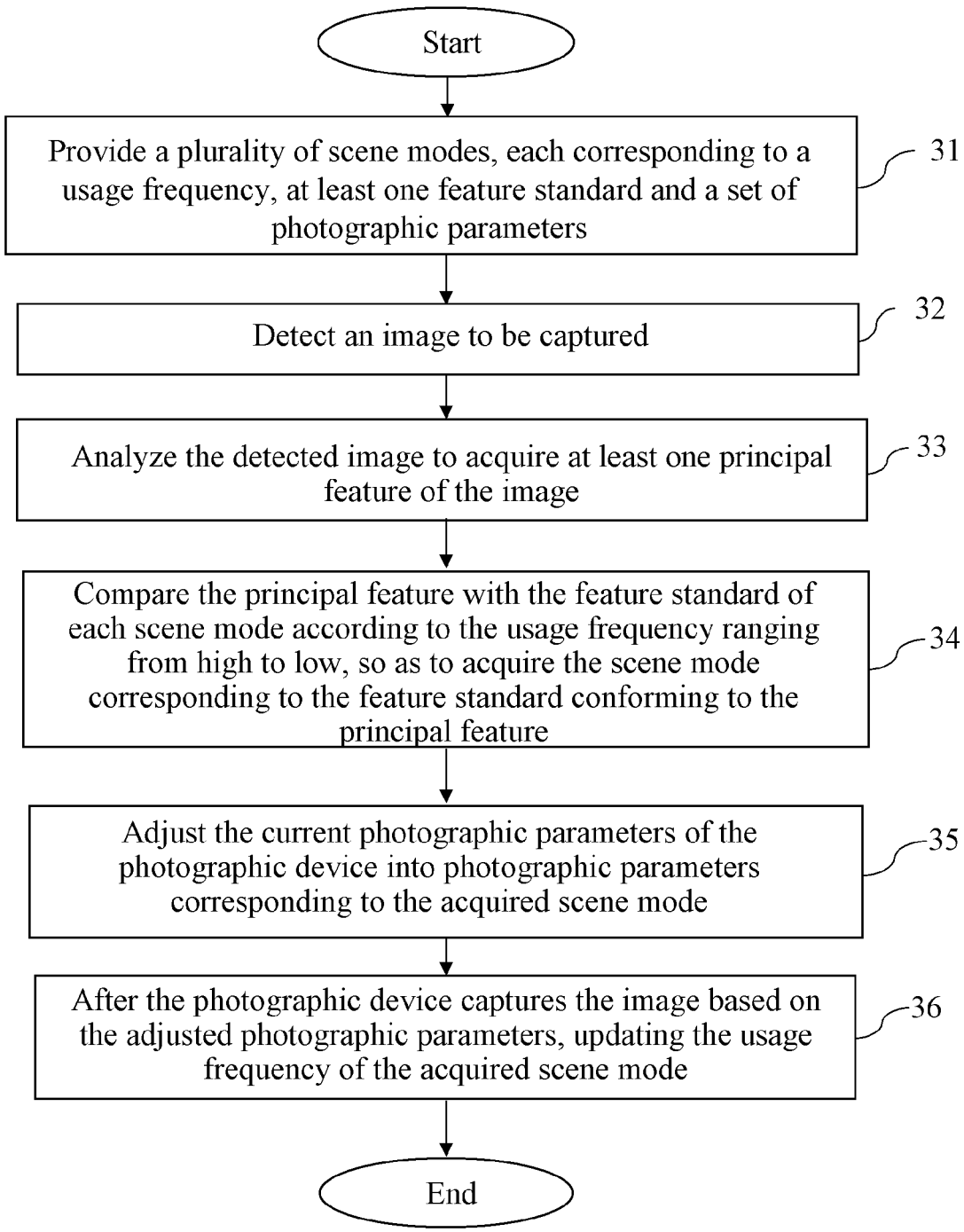
FIG. 4 is a flow chart according to a fourth embodiment of the present invention.

FIG. 4 is a flow chart according to a fourth embodiment of the present invention. After the photographic device captures the image based on the adjusted photographic parameters, the usage frequency of the acquired scene mode is updated (Step 36).

In the method for automatically selecting a scene mode disclosed in this embodiment, the scene mode used each time is added into the former usage frequency. The usage frequency of each scene is re-calculated to update the usage frequency of each scene mode, so as to further conform to the sequence of the scene mode used by the user and achieve the personalized setting.

Figure 5:
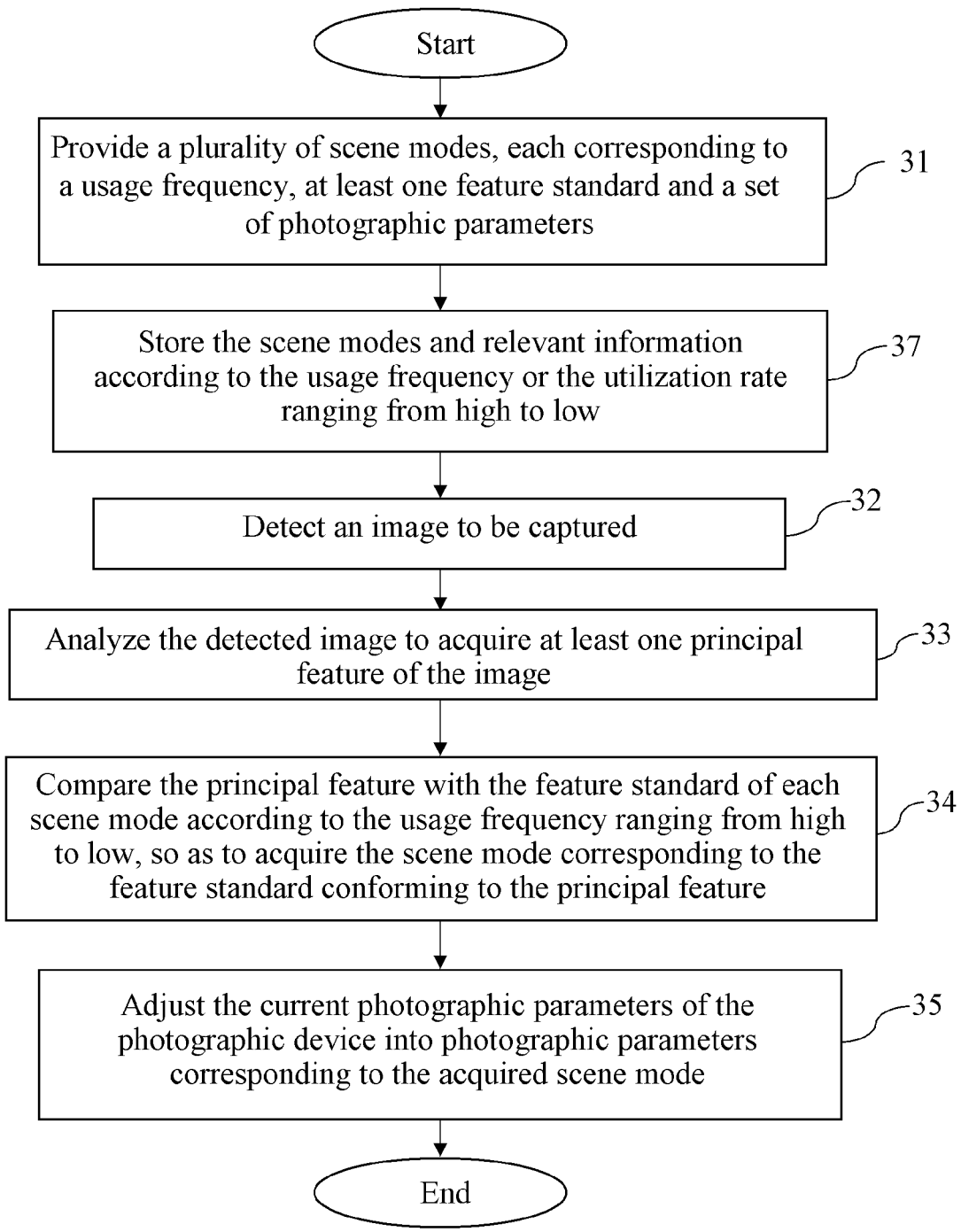
FIG. 5 is a flow chart according to a fifth embodiment of the present invention.

FIG. 5 is a flow chart according to a fifth embodiment of the present invention. The method for automatically selecting a scene mode disclosed in this embodiment is approximately the same as the above embodiment, thus being not repeated. This embodiment further includes: storing the scene modes and relevant information according to the usage frequency or the utilization rate ranging from high to low (Step 37). The relevant information includes the feature standards and the photographic parameters corresponding to the scene modes.

Herein, firstly, a comparison sequence table is arranged according to the usage frequency or the utilization rate ranging from high to low of each scene mode. The scene modes and relevant information are stored according to the comparison sequence table. Thereby, the photographic device acquires the principal feature of the image and then compares with each scene mode according to the comparison sequence table directly. Therefore, after comparing a scene mode, it is not necessary for the photographic device to further search the next scene mode having a lower usage frequency, so as to reduce the searching time of the photographic device, and further accelerate the speed for automatic selection of scene.

Figure 6:
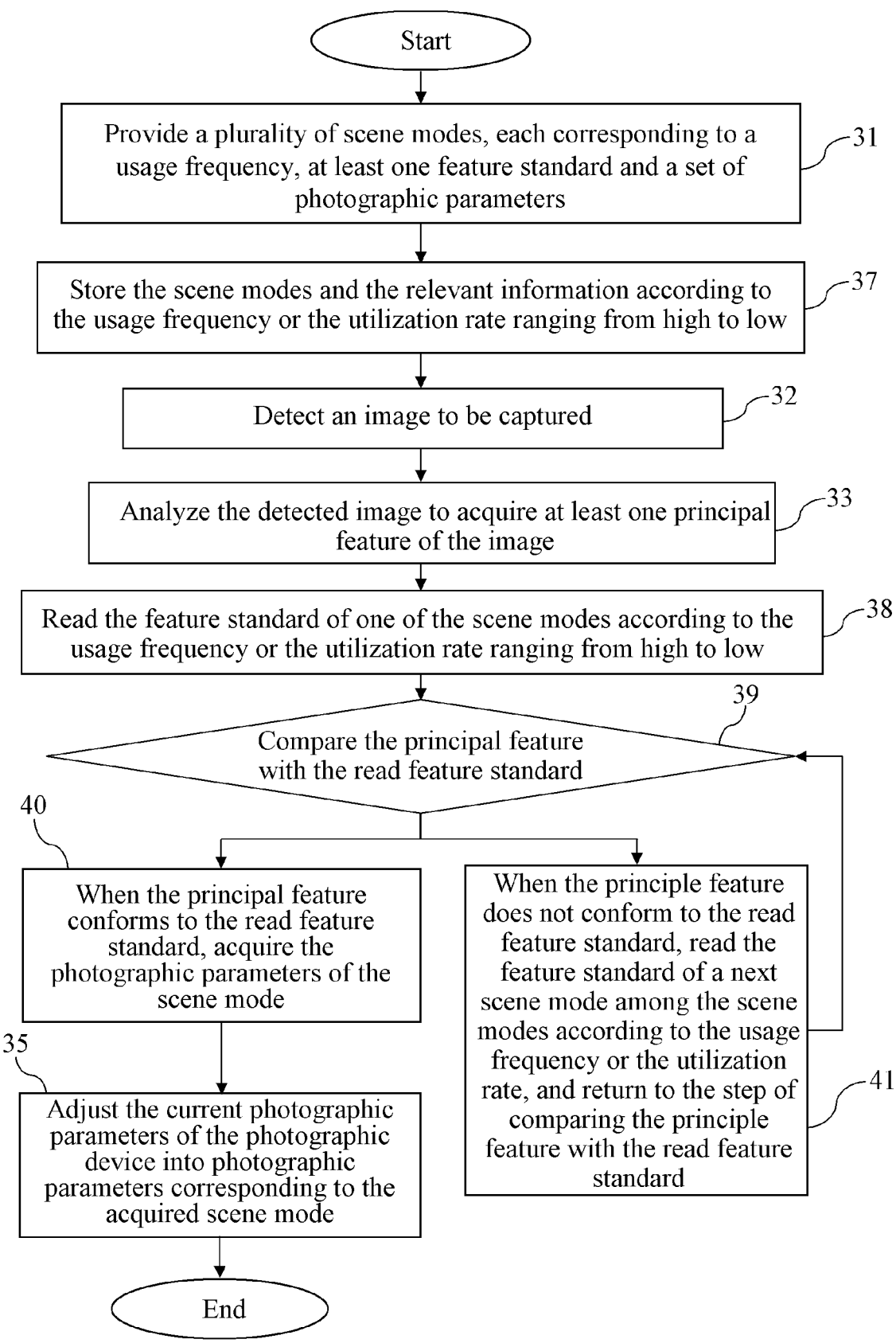
FIG. 6 is a flow chart according to a sixth embodiment of the present invention.

FIG. 6 is a flow chart according to a sixth embodiment of the present invention. When the scene mode and the relevant information are stored according to the usage frequency and the utilization rate ranging from high to low, the step of comparing the principal feature with the feature standard of each scene mode according to the usage frequency or the utilization rate ranging from high to low is realized by the following steps. The feature standard of one of the scene modes is read according to the usage frequency or the utilization rate ranging from high to low (Step 38). The principal feature is compared with the read feature standard (Step 39). When the principal feature does not conform to the read feature standard, the photographic parameters of the scene mode are acquired (Step 40). When the principal feature does not conform to the read feature standard, the feature standard of the next scene mode is read according to the usage frequency ranging from high to low, and the procedure returns to the step of comparing the principal feature with the read feature standard (Step 41).

What is claimed is:

1. A method for automatically selecting a scene mode applied in a photographic device, comprising:
    providing a plurality of scene modes, each corresponding to a utilization rate, at least one feature standard, and a set of photographic parameters;
    detecting an image to be captured;
    analyzing the detected image to acquire at least one principal feature of the image;
    comparing the principal feature with the feature standard of each scene mode according to a comparison sequence of utilization rate ranging from high to low, so as to acquire the scene mode corresponding to the feature standard conforming to the principal feature;
    adjusting the current photographic parameters of the photographic device into photographic parameters corresponding to the acquired scene mode; and
    after the photographic device captures images based on the adjusted set of photographic parameters, re-calculating the utilization rate to update the utilization rate of each scene mode.

2. The method for automatically selecting a scene mode according to claim 1, wherein the scene mode comprises more than two of a landscape mode, a portrait mode, a night mode, a macro mode, and a motion mode.

3. The method for automatically selecting a scene mode according to claim 2, wherein the feature standard of the portrait mode is that the portrait occupies more than one third of the image.

4. A method for automatically selecting a scene mode applied in a photographic device, comprising:
    providing a plurality of scene modes, each corresponding to a usage frequency, at least one feature standard, and a set of photographic parameters;
    detecting an image to be captured;
    analyzing the detected image to acquire at least one principal feature of the image;
    comparing the principal feature with the feature standard of each scene mode according to the usage frequency ranging from high to low, so as to acquire the scene mode corresponding to the feature standard conforming to the principal feature; adjusting the current photographic parameters of the photographic device into photographic parameters corresponding to the acquired scene mode; and
    updating the usage frequency of the acquired scene mode after the photographic device captures the image based on the adjusted set of photographic parameters.

5. The method for automatically selecting a scene mode according to claim 4, further comprising:
    storing the scene mode according to the usage frequency ranging from high to low.

6. The method for automatically selecting a scene mode according to claim 4, wherein the step of comparing the principal feature with the feature standard of each scene mode comprises:
    reading the feature standard of one of the scene modes according to the usage frequency ranging from high to low;
    comparing the principal feature with the read feature standard;
    when the principal feature conforms to the read feature standard, acquiring the set of photographic parameters of the corresponding scene mode; and
    when the principal feature does not conform to the read feature standard, reading the feature standard of the next scene mode according to the usage frequency ranging from high to low, and returning to the step of comparing the principal feature with the read feature standard.

7. The method for automatically selecting a scene mode according to claim 4, further comprising:
    re-arranging and storing the scene mode according to the updated usage frequency.

8. The method for automatically selecting a scene mode according to claim 4, wherein the scene mode comprises more than two of a landscape mode, a portrait mode, a night mode, a macro mode, and a motion mode.

9. The method for automatically selecting a scene mode according to claim 4, wherein the feature standard of the portrait mode is that the portrait occupies more than one third of the image.

* * * * *